(12) United States Patent
Numata et al.

(10) Patent No.: US 11,289,714 B2
(45) Date of Patent: Mar. 29, 2022

(54) POROUS BODY, CURRENT COLLECTOR INCLUDING THE SAME, AND FUEL CELL

(71) Applicant: SUMITOMO ELECTRIC INDUSTRIES, LTD., Osaka (JP)

(72) Inventors: Koma Numata, Osaka (JP); Masatoshi Majima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 182 days.

(21) Appl. No.: 16/627,672

(22) PCT Filed: Apr. 25, 2019

(86) PCT No.: PCT/JP2019/017552
§ 371 (c)(1),
(2) Date: Dec. 30, 2019

(87) PCT Pub. No.: WO2019/244480
PCT Pub. Date: Dec. 26, 2019

(65) Prior Publication Data
US 2020/0350600 A1    Nov. 5, 2020

(30) Foreign Application Priority Data
Jun. 21, 2018   (JP) .............................. JP2018-118044

(51) Int. Cl.
*H01M 8/0232* (2016.01)
*H01M 8/0247* (2016.01)

(52) U.S. Cl.
CPC ....... *H01M 8/0232* (2013.01); *H01M 8/0247* (2013.01)

(58) Field of Classification Search
CPC combination set(s) only.
See application file for complete search history.

(56) References Cited

U.S. PATENT DOCUMENTS

| | | | |
|---|---|---|---|
| 2013/0266862 A1 | 10/2013 | Okuno et al. | |
| 2013/0295459 A1 | 11/2013 | Nishimura et al. | |
| 2017/0005345 A1 | 1/2017 | Lee et al. | |
| 2017/0133699 A1* | 5/2017 | Hiraiwa | H01M 8/12 |
| 2018/0030607 A1* | 2/2018 | Okuno | C25D 1/08 |

FOREIGN PATENT DOCUMENTS

| | | | |
|---|---|---|---|
| JP | H11-154517 A | | 6/1999 |
| JP | 2012119126 A | * | 6/2012 |
| JP | 2012-132083 A | | 7/2012 |

(Continued)

OTHER PUBLICATIONS

English translation of KR-20140009625-A (Year: 2014).*
English translation of KR-20150075442-A (Year: 2015).*
English translation of JP-2012119126-A (Year: 2012).*

*Primary Examiner* — Ula C Ruddock
*Assistant Examiner* — Sarika Gupta
(74) *Attorney, Agent, or Firm* — Oliff PLC

(57) ABSTRACT

A porous body with a framework having an integrally continuous, three-dimensional network structure, the framework comprising an outer shell and a core including one or both of a hollow or a conductive material, the outer shell including nickel and cobalt, the cobalt having a ratio in mass of 0.2 or more and 0.4 or less or 0.6 or more and 0.8 or less relative to the total mass of the nickel and the cobalt.

10 Claims, 8 Drawing Sheets

(56) References Cited

FOREIGN PATENT DOCUMENTS

| | | | |
|---|---|---|---|
| JP | 2012-149282 A | | 8/2012 |
| JP | 2016-015217 A | | 1/2016 |
| JP | 2017-507452 A | | 3/2017 |
| KR | 20140009625 A | * | 1/2014 |
| KR | 20150075442 | * | 7/2016 |
| WO | 2016/132811 A1 | | 8/2016 |

* cited by examiner

POROUS BODY, CURRENT COLLECTOR INCLUDING THE SAME, AND FUEL CELL

TECHNICAL FIELD

The present disclosure relates to a porous body, a current collector including the same, and a fuel cell.

This application claims priority based on Japanese Patent Application No. 2018-118044 filed on Jun. 21, 2018, which is incorporated herein by reference.

BACKGROUND ART

As a method for producing a porous body, for example, Japanese Patent Laying-Open No. 11-154517 (PTL 1) discloses that after a treatment for imparting conductiveness to a foamed resin or the like, an electroplating layer made of metal is formed on the foamed resin, and the foamed resin is incinerated, as required, and thus removed to produce a porous metal body.

Furthermore, Japanese Patent Laying-Open No. 2012-132083 (PTL 2) discloses a porous metal body having a framework mainly composed of a nickel-tin alloy as a porous metal body having oxidation resistance and corrosion resistance as characteristics. Japanese Patent Laying-Open No. 2012-149282 (PTL 3) discloses a porous metal body having a framework mainly composed of a nickel-chromium alloy as a porous metal body having high corrosion resistance.

CITATION LIST

Patent Literature

PTL 1: Japanese Patent Laying-Open No. 11-154517
PTL 2: Japanese Patent Laying-Open No. 2012-132083
PTL 3: Japanese Patent Laying-Open No. 2012-149282

SUMMARY OF INVENTION

A porous body according to one embodiment of the present disclosure is a porous body with a framework having an integrally continuous, three-dimensional network structure, the framework comprising an outer shell and a core including one or both of a hollow or a conductive material, the outer shell including nickel and cobalt, the cobalt having a ratio in mass of 0.2 or more and 0.4 or less or 0.6 or more and 0.8 or less relative to the total mass of the nickel and the cobalt.

A current collector according to one embodiment of the present disclosure includes the porous body described above.

A fuel cell according to one embodiment of the present disclosure includes the current collector described above.

DETAILED DESCRIPTION

Figure 1:
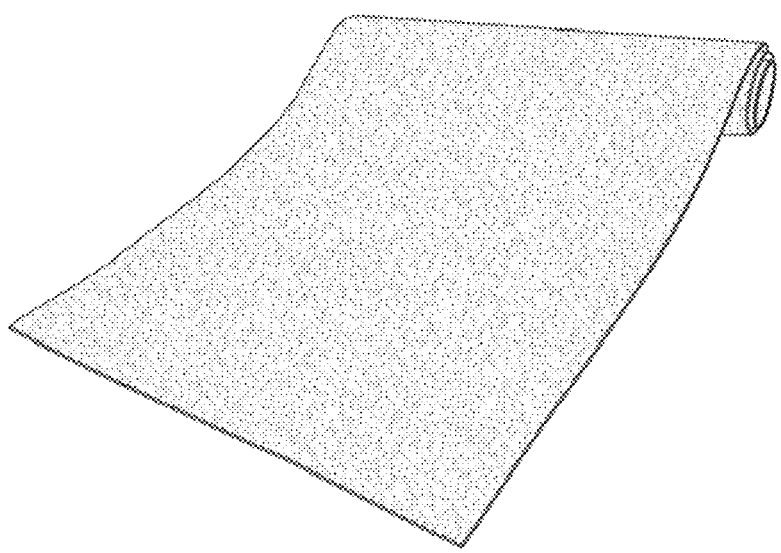
FIG. 1 is a diagram of a general, external appearance of a porous body according to one embodiment of the present disclosure.

Problem to be Solved by the Present Disclosure

When the porous body is used as a current collector for a battery cell, a solid oxide fuel cell (SOFC) in particular, it is exposed to a high temperature of 700 to 1,000° C., and accordingly, the more it is used, the more it is oxidized, and it tends to be less conductive. For this reason, there exists a strong demand for the porous body to present performance to maintain high conductivity in a high temperature environment. While the porous bodies of Patent Literature 2 and 3 are both excellent in oxidation resistance, and can thus relatively maintain conductivity in a high temperature environment, there may be a demand to maintain conductivity higher than that. Furthermore, chromium volatilizes in a high temperature environment of about 800° C., and there is a risk of so-called Cr poisoning that impairs a fuel cell's catalyst in performance, and accordingly, there is room for improvement when a porous body containing chromium is used as a current collector of a SOFC.

In view of the above circumstances, an object of the present disclosure is to provide a porous body capable of maintaining high conductivity in a high temperature environment, a current collector including the porous body, and a fuel cell.

Advantageous Effect of the Present Disclosure

Thus there can be provided a porous body capable of maintaining high conductivity in a high temperature environment, a current collector including the porous body, and a fuel cell.

[Description of Embodiments of the Present Disclosure]

The present inventors have conducted an investigation for a porous body which can maintain high conductivity in a high temperature environment. Through that process, the present inventors have found that a porous body maintains excellent conductivity despite use in a high temperature environment when its framework having a three-dimensional network structure includes nickel and cobalt at a specific mass ratio. Thus the present inventors have arrived at the porous body according to the present disclosure.

Initially, embodiments of the present disclosure will be enumerated and specifically described.

[1] A porous body according to one embodiment of the present disclosure is a porous body with a framework having an integrally continuous, three-dimensional network structure, the framework comprising an outer shell and a core including one or both of a hollow or a conductive material, the outer shell including nickel and cobalt, the cobalt having a ratio in mass of 0.2 or more and 0.4 or less or 0.6 or more and 0.8 or less relative to the total mass of the nickel and the cobalt. The porous body having such a feature can maintain high conductivity in a high temperature environment.

[2] Preferably, the outer shell further includes at least one additive element selected from the group consisting of nitrogen, sulfur, fluorine, and chlorine, and the additive element is 5 ppm or more and 10,000 ppm or less. In this case, high strength can be ensured while high conductivity can be maintained in a high temperature environment.

[3] Preferably, the outer shell further includes phosphorus as an additive element, and the additive element is 5 ppm or more and 50,000 ppm or less. In this case, high strength can be ensured while high conductivity can be maintained in a high temperature environment.

[4] Preferably, the outer shell further includes at least two or more additive elements selected from the group consisting of nitrogen, sulfur, fluorine, chlorine and phosphorus, and the total of the additive elements is 5 ppm or more and 50,000 ppm or less. In this case, high strength can be ensured while high conductivity can be maintained in a high temperature environment.

[5] Preferably, the outer shell further includes oxygen. Although the present embodiment means that the porous body is oxidized as it is used, the porous body even in such a state can maintain high conductivity in a high temperature environment.

[6] The oxygen is preferably contained in the outer shell in an amount of 0.1% by mass or more and 35% by mass or less. In this case, high conductivity can be more effectively maintained in a high temperature environment.

[7] The outer shell preferably includes a spinel-type oxide. In this case also, high conductivity can be more effectively maintained in a high temperature environment.

[8] Preferably, when the outer shell is observed in cross section at a magnification of 3,000 times to obtain an image, the image presents in any area 10 µm square thereof five or less voids each having a longer diameter of 1 µm or more. This can provide sufficiently increased strength.

[9] The core is preferably hollow. This allows the porous body to be lightweight and can also reduce the amount of metal required.

[10] The porous body preferably has a sheet-shaped external appearance and has a thickness of 0.2 mm or more and 2 mm or less. This allows the porous body to be smaller in thickness than conventional, and can hence reduce the amount of metal required.

[11] A current collector according to one embodiment of the present disclosure includes the porous body described above. The current collector having such a feature can maintain high conductivity in a high temperature environment.

[12] A fuel cell according to one embodiment of the present disclosure includes the current collector described above. A fuel cell having such a feature can maintain high conductivity in a high temperature environment and can hence efficiently generate power.

[Details of Embodiments of the Present Disclosure]

Hereinafter, an embodiment of the present disclosure (hereinafter also referred to as "the present embodiment") will be described. It should be noted, however, that the present embodiment is not a limitation. In the present specification, an expression in the form of "A-B" means a range's upper and lower limits (that is, A or more and B or less), and when A is not accompanied by any unit and B is alone accompanied by a unit, A has the same unit as B.

<<Porous Body>>

As shown in FIG. 1, a porous body according to the present embodiment is a porous body with a framework having an integrally continuous, three-dimensional network structure, the framework comprising an outer shell and a core including one or both of a hollow or a conductive material, the outer shell including nickel and cobalt, the cobalt having a ratio in mass of 0.2 or more and 0.4 or less or 0.6 or more and 0.8 or less relative to the total mass of the nickel and the cobalt. The porous body having such a feature can maintain high conductivity in a high temperature environment.

While it is unknown what mechanism specifically works to allow the porous body to maintain high conductivity in a high temperature environment, it is believed as below: When the porous body is used as a current collector for a solid oxide fuel cell (SOFC) and thus exposed to a high temperature of 700 to 1,000° C., the porous body's framework having a three-dimensional network structure is entirely oxidized. Note, however, that, relative to the total mass of the nickel and cobalt of the outer shell of the framework, the cobalt has a ratio in mass of 0.2 or more and 0.4 or less or 0.6 or more and 0.8 or less.

Herein, preferably the outer shell further includes at least one additive element selected from the group consisting of nitrogen, sulfur, fluorine, and chlorine, and the additive element is 5 ppm or more and 10,000 ppm or less. More preferably, it is 10 ppm or more and 8,000 ppm or less. Furthermore, the outer shell may include phosphorus as an additive element, and the additive element in that case is 5 ppm or more and 50,000 ppm or less. More preferably, it is 10 ppm or more and 40,000 ppm or less.

Furthermore, preferably, the outer shell further includes at least two or more additive elements selected from the group consisting of nitrogen, sulfur, fluorine, chlorine, and phosphorus, and the total of the additive elements is 5 ppm or more and 50,000 ppm or less. More preferably, it is 10 ppm or more and 10,000 ppm or less.

When the porous body is used as a material of a current collector of a SOFC, it is exposed to a high temperature of 700 to 1,000° C., as has been set forth above. However, as the outer shell includes the additive element described above, the porous body can maintain high strength (or creep characteristic).

In the outer shell, an oxide composed of at least one of nickel and cobalt, and oxygen, and having a spinel-type, steric conformation (hereinafter also referred to as a "spinel-type oxide") is generated by oxidation. Specifically, an oxide represented by a chemical formula of $Ni_xCo_{3-x}O_4$, where $0.6 \leq x \leq 1.2$ or $1.8 \leq x \leq 2.4$), typically $NiCo_2O_4$ or $Ni_2CoO_4$, is generated in the outer shell by oxidation. As the outer shell is oxidized, a spinel-type oxide represented by the chemical formula of $CoCo_2O_4$ may also be generated. Spinel-type oxides represented by these chemical formulas are known as highly conductive oxides of the same type as oxides (e.g., $LiMn_2O_4$) that are widely used as a material for an electrode for a secondary battery, for example. It is thus believed that the porous body can maintain high conductivity even when it has its outer shell entirely oxidized as it is used in a high temperature environment.

Figure 2:
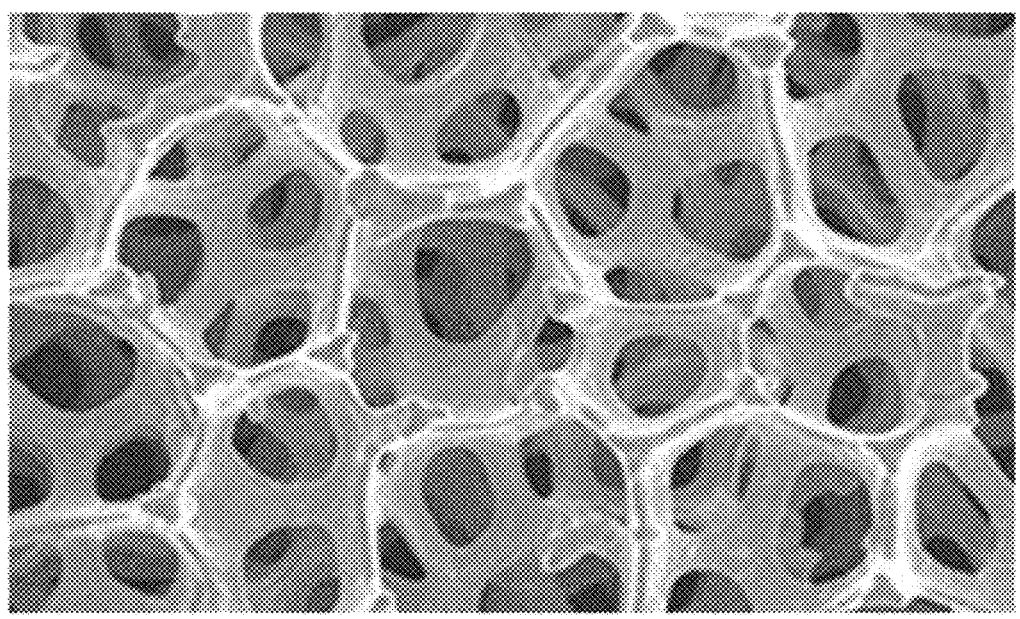
FIG. 2 is an enlarged photographical image of an external appearance of a porous body according to one embodiment of the present disclosure.

The porous body can have an external appearance shaped in a variety of forms, such as a sheet, a rectangular parallelepiped, a sphere, and a cylinder. Inter alia, as shown in FIG. 2, the porous body preferably has a sheet-shaped external appearance and has a thickness of 0.2 mm or more and 2 mm or less. The porous body more preferably has a thickness of 0.5 mm or more and 1 mm or less. The porous body having a thickness of 2 mm or less can be smaller in thickness than conventional, and can reduce the amount of metal required. The porous body having a thickness of 0.2 mm or more can have necessary strength. The thickness can be measured for example with a commercially available digital thickness gauge (by Teclock).

Note that the outer shell of the porous body may be entirely composed of metal alone or may partially include the oxide described above. Moreover, the outer shell may entirely be comprised of the oxide described above.

<Framework>

Figure 3:
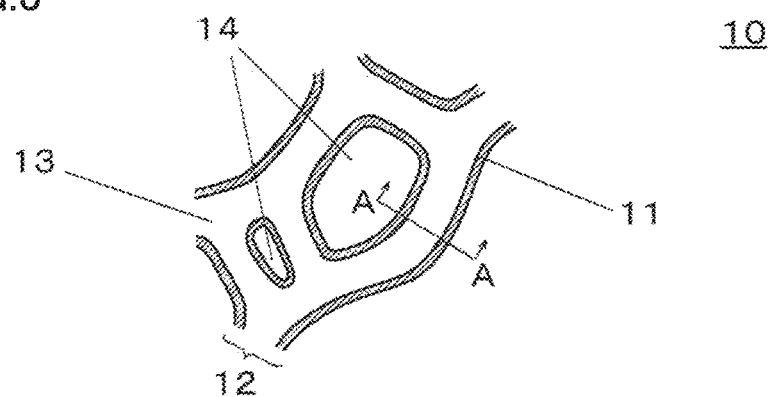
FIG. 3 is a schematic partial cross section generally showing a partial cross section of a framework of a porous body according to one embodiment of the present disclosure.

As shown in FIG. 3, the porous body has a three-dimensional network structure having a framework 12 and a pore 14. The three-dimensional network structure will more specifically be described hereinafter. Framework 12 includes an outer shell 11 including nickel and cobalt, and a core 13 including one or both of a hollow or a conductive material surrounded by outer shell 11. Framework 12 forms a rib and a node, as will be described hereinafter.

Figure 4:
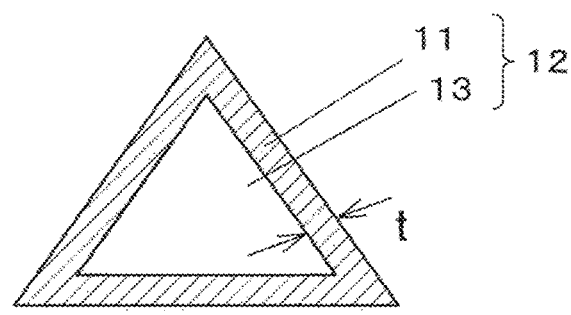
FIG. 4 is a cross section taken along a line A-A shown in FIG. 3.

Furthermore, as shown in FIG. 4, framework 12 preferably has a triangular cross section orthogonal to its longitudinal direction. However, the cross section of framework 12 should not be limited thereto. The cross section of framework 12 may be a polygonal cross section other than a triangular cross section, such as a quadrangular or hexagonal cross section. Furthermore, framework 12 may have a circular cross section.

That is, preferably, framework 12 is such that core 13 surrounded by outer shell 11 has a hollow tubular shape, and framework 12 has a triangular or other polygonal, or circular cross section orthogonal to its longitudinal direction. Since framework 12 has a tubular shape, outer shell 11 has an inner wall which forms an inner surface of the tube and an outer wall which forms an outer surface of the tube. Framework 12 having outer shell 11 surrounding core 13 that is hollow allows the porous body to be significantly lightweight. However, the framework is not limited to being hollow and may instead be solid. In this case, the porous body can be enhanced in strength.

The porous body preferably includes nickel and cobalt such that they have a total apparent weight of 200 g/m² or more and 1,000 g/m² or less. The apparent weight is more preferably 250 g/m² or more and 900 g/m² or less. As will be described hereinafter, the apparent weight can be appropriately adjusted for example when nickel-cobalt alloy plating is applied on a conductive resin molded body having undergone a conductiveness imparting treatment.

The total apparent weight of nickel and cobalt described above is converted into a mass per unit volume of the porous body (or an apparent density of the porous body), as follows: That is, the porous body has an apparent density preferably of 0.14 g/cm³ or more and 0.75 g/cm³ or less, more preferably 0.18 g/cm³ or more and 0.65 g/cm³ or less. Herein, the "porous body's apparent density" is defined by the following expression:

$$\text{Porous body's apparent density (g/cm}^3) = M(g)/V(\text{cm}^3),$$

where

M: mass of porous body [g], and

V: volume of shape of external appearance of porous body [cm³].

The porous body has a porosity preferably of 40% or more and 98% or less, more preferably 45% or more and 98% or less, and most preferably 50% or more and 98% or less. The porous body having a porosity of 40% or more can be significantly lightweight and can have an increased surface area. The porous body having a porosity of 98% or less can have sufficient strength.

The porous body's porosity is defined by the following expression:

$$\text{Porosity (\%)} = [1 - \{M/(V \times d)\}] \times 100,$$

where

M: mass of porous body [g],

V: volume of shape of external appearance of porous body [cm³], and d: density of metal constituting porous body [g/cm³].

The porous body preferably has an average pore diameter of 350 μm or more and 3,500 μm or less. The porous body having an average pore diameter of 350 μm or more facilitates passing a gas throughout the porous body. The porous body having an average pore diameter of 3,500 μm or less can be enhanced in bendability (or bending workability). From these viewpoints, the porous body has an average pore diameter more preferably of 350 μm or more and 1,000 μm or less, and most preferably 350 μm or more and 850 μm or less.

The porous body's average pore diameter can be determined by the following method: That is, initially, a microscope is used to observe a surface of the porous body at a magnification of 3,000 times to obtain an enlarged image, and at least 10 fields of view of such enlarged images are prepared, and in each field of view, the number of pores is determined per 1 inch (25.4 mm=25,400 μm) of cells described hereinafter. Furthermore, the number of pores in these 10 fields of view is averaged to obtain an average value ($n_c$) which is in turn substituted into the following expression to calculate a numerical value, which is herein defined as the porous body's average pore diameter:

Average pore diameter (μm)=25,400 μm/$n_c$.

When the framework has its outer shell observed in cross section at a magnification of 3,000 times to obtain an image, the image preferably presents in any area 10 μm square thereof five or less voids each having a longer diameter of 1 μm or more. The number of voids is more preferably 3 or less. The porous body can thus sufficiently be enhanced in strength. Furthermore, it is understood that as the number of voids is 5 or less, the porous body is different from a formed body obtained by sintering fine powder. The lower limit of the number of observed voids is, for example, zero. Herein, the "number of voids" means an average in number of voids obtained by observing each of a plurality of "areas 10 μm square" in a cross section of the outer shell.

The outer shell can be observed in cross section by using an electron microscope. Specifically, it is preferable to obtain the "number of voids" by observing a cross section of the outer shell in 10 fields of view. The cross section of the outer shell may be a cross section orthogonal to the longitudinal direction of the framework or may be a cross section parallel to the longitudinal direction of the framework. In the observed image, a void can be distinguished from other parts by contrast in color (or difference in brightness). While the upper limit of the longer axis of the void should not be limited, it is for example 10,000 μm.

The outer shell preferably has an average thickness of 10 μm or more and 50 μm or less. Herein, "the outer shell's thickness" means a shortest distance from an inner wall, or an interface with the hollow of the core, of the framework to an outer wall of the outer shell located on an external side of the outer shell, and an average value thereof is defined as "the outer shell's average thickness." The outer shell's thickness can be determined by observing a cross section of the framework with an electron microscope.

Specifically, the outer shell's average thickness can be determined by the following method: Initially, a sheet-shaped porous body is cut. In this case, one cross section of the framework cut perpendicular to the longitudinal direction of the framework is selected and observed with an electron microscope at a magnification of 3,000 times to obtain an image. Subsequently, a thickness t of any one side of a polygon (e.g., the triangle shown in FIG. 4) forming one framework appearing in the observed image is measured at a center of the side, and defined as the outer shell's thickness. Further, such a measurement is done for 10 observed images (or in 10 fields of view thereof) to obtain the outer shell's thickness at 10 points. Finally, the 10 points' average value is calculated to obtain the outer shell's average thickness.

(Three-Dimensional Network Structure)

The porous body includes a framework having a three-dimensional network structure. In the present embodiment, a "three-dimensional network structure" means a structure in which a metal component (e.g., an alloy made of nickel and cobalt) constituting the three-dimensional network spreads three-dimensionally in a network. The three-dimensional network structure is formed by a framework. Hereinafter, the three-dimensional network structure will more specifically be described.

Figure 5A:
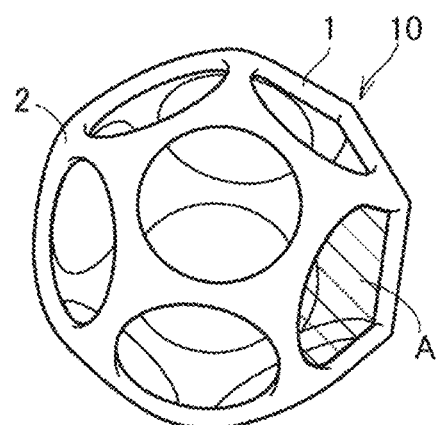
FIG. 5A is an enlarged schematic diagram focusing on one cell in the porous body in order to illustrate a three-dimensional network structure of the porous body according to one embodiment of the present disclosure.
Figure 5B:
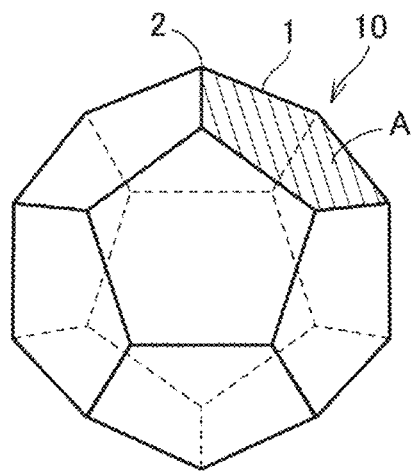
FIG. 5B is a schematic diagram showing an embodiment of the shape of the cell.
Figure 9:
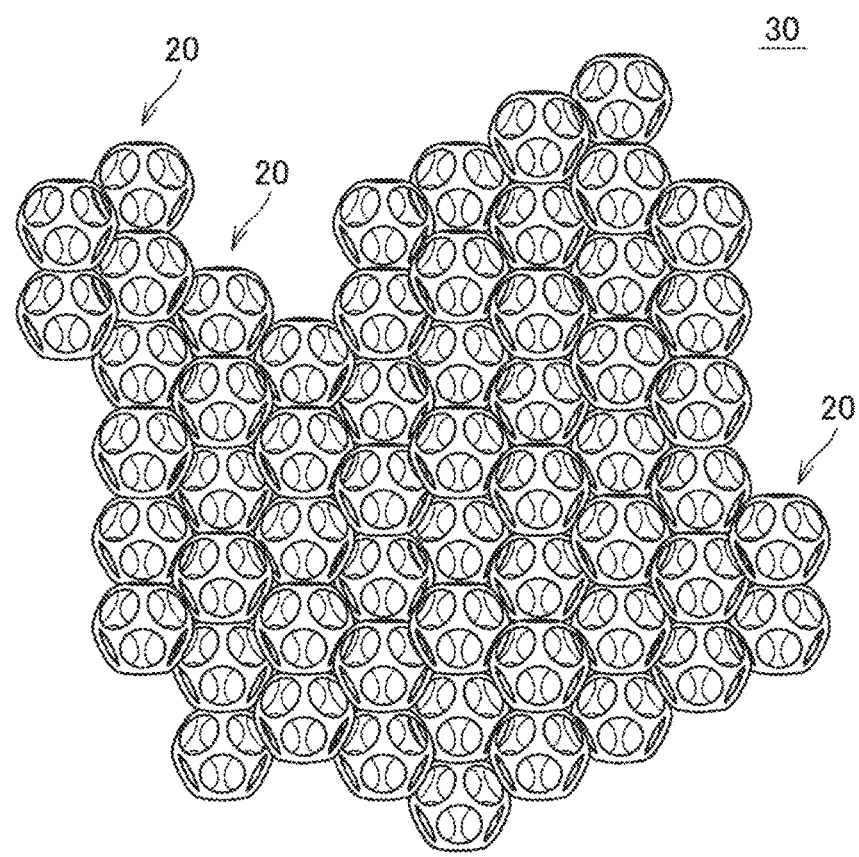
FIG. 9 is a schematic diagram showing one embodiment of a three-dimensional network structure formed by a plurality of cells joined together.

As shown in FIG. 9, a three-dimensional network structure 30 has a cell 20 as a basic unit, and is formed of a plurality of cells 20 joined together. As shown in FIGS. 5A and 5B, cell 20 includes a rib 1 and a node 2 that connects a plurality of ribs 1. Although rib 1 and node 2 are described separately in terminology for the sake of convenience, there is no clear boundary therebetween. That is, a plurality of ribs 1 and a plurality of nodes 2 are integrated together to form cell 20, and cell 20 serves as a constituent unit to form three-dimensional network structure 30. Hereinafter, in order to facilitate understanding, the cell shown in FIG. 5A will be described as the regular dodecahedron shown in FIG. 5B.

Initially, a plurality of ribs 1 and a plurality of nodes 2 are used to form a frame 10 in the form of a planar polygonal structure. While FIG. 5B shows frame 10 having a polygonal structure that is a regular pentagon, frame 10 may be a polygon other than a regular pentagon, such as a triangle, a quadrangle, or a hexagon. Herein, the structure of frame 10 can also be understood such that a plurality of ribs 1 and a plurality of nodes 2 form a planar polygonal aperture. In the present embodiment, the planar polygonal aperture has a diameter, which means a diameter of a circle circumscribing the planar polygonal aperture defined by frame 10. A plurality of frames 10 combined together to form cell 20 that is a three-dimensional, polyhedral structure. In doing so, one rib 1 and one node 2 are shared by a plurality of frames 10.

As shown in the schematic diagram of FIG. 4 described above, rib 1 preferably has, but is not limited to, a hollow tubular shape and has a triangular cross section. Rib 1 may be a polygonal cross section other than a triangular cross section, such as a quadrangular or hexagonal cross section, or a circular cross section. Node 2 may be shaped to have a vertex to have a sharp edge, the vertex chamfered to have a planar shape, or the vertex rounded to have a curved shape.

Figure 6A:
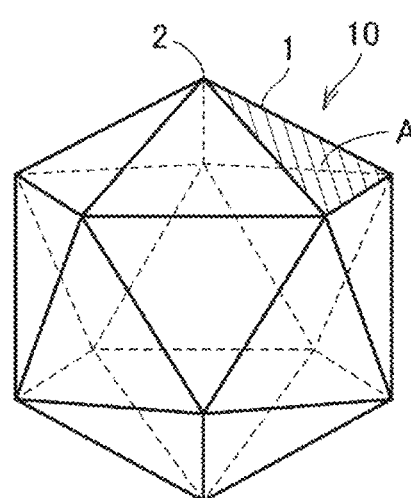
FIG. 6A is a schematic diagram showing another embodiment of the shape of the cell.
Figure 6B:
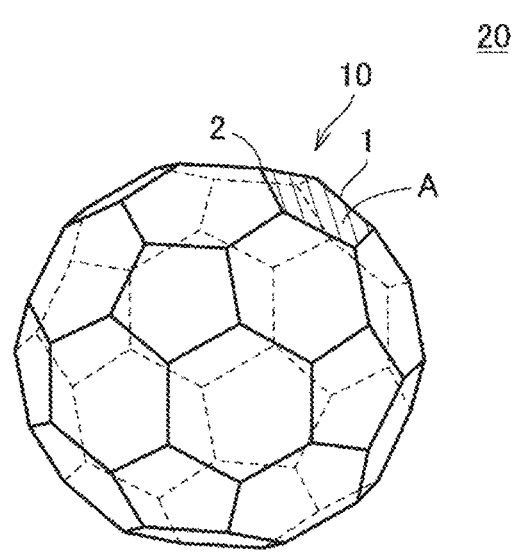
FIG. 6B is a schematic diagram showing still another embodiment of the shape of the cell.

While the polyhedral structure of cell 20 is a dodecahedron in FIG. 5B, it may be other polyhedrons such as a cube, an icosahedron (see FIG. 6A), and a truncated icosahedron (see FIG. 6B). Herein, the structure of cell 20 can also be understood as forming a three-dimensional space surrounded by a virtual plane A defined by each of a plurality of frame 10. In the present embodiment, it can be understood that the three-dimensional space has a pore with a diameter (hereinafter also referred to as a "pore diameter") which is a diameter of a sphere circumscribing the three-dimensional space defined by cell 20. Note, however, that in the present embodiment the porous body's pore diameter is calculated based on the above-described calculation formula for the sake of convenience. That is, the diameter of the pore (or pore diameter) of the three-dimensional space defined by cell 20 refers to what is the same as the porous body's porosity and average pore diameter.

Figure 7:
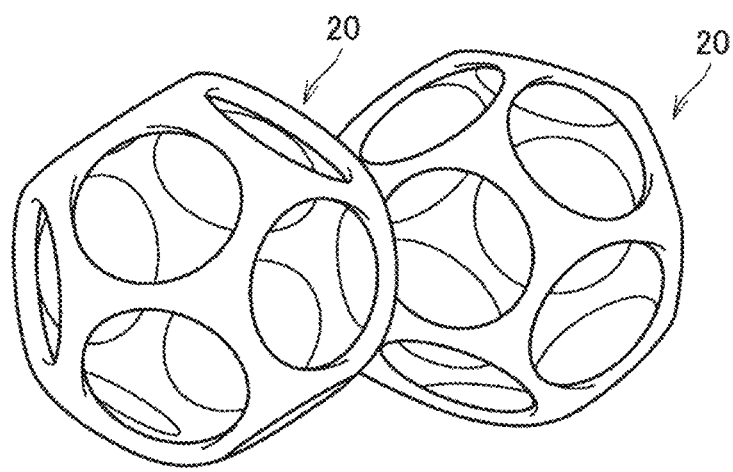
FIG. 7 is a schematic diagram showing two cells joined together.
Figure 8:
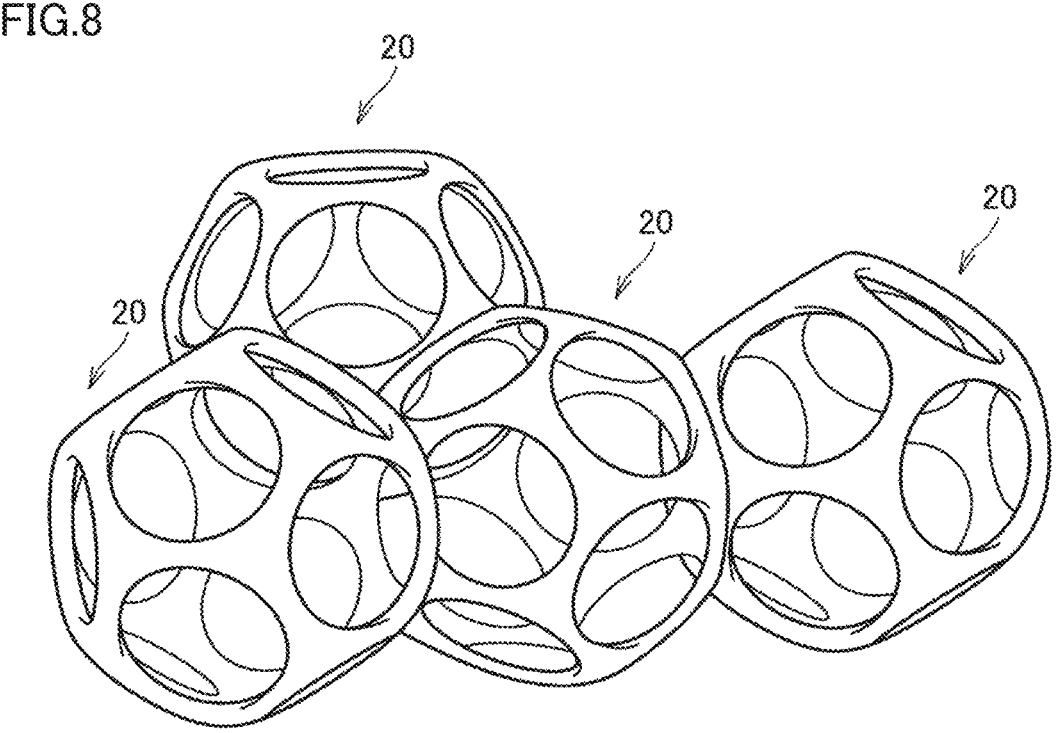
FIG. 8 is a schematic diagram showing four cells joined together.

A plurality of cells 20 are combined together to form three-dimensional network structure 30 (see FIGS. 7 to 9). In doing so, frame 10 is shared by two cells 20.

Three-dimensional network structure 30 can also be understood to include frame 10 and can also be understood to include cell 20.

As has been described above, the porous body has a three-dimensional network structure that forms a planar polygonal aperture (or a frame) and a three-dimensional space (or a cell). Therefore, it can be clearly distinguished from a two-dimensional network structure only having a planar aperture (e.g., a punched metal, a mesh, etc.). Furthermore, the porous body has a plurality of ribs and a plurality of nodes integrally forming a three-dimensional network structure, and can thus be clearly distinguished from a structure such as non-woven fabric formed by intertwining fibers serving as constituent units. The porous body having such a three-dimensional network structure can have continuous pores.

In the present embodiment, the three-dimensional network structure is not limited to the above-described structure. For example, the cell may be formed of a plurality of frames each having a different size and a different planar shape. Furthermore, the three-dimensional network structure may be formed of a plurality of cells each having a different size and a different three-dimensional shape. The three-dimensional network structure may partially include a frame without having a planar polygonal aperture therein or may partially include a cell without having a three-dimensional space therein (or a solid cell).

(Nickel and Cobalt)

While the framework's outer shell includes nickel and cobalt, as described above, the outer shell does not exclude including an additive element other than nickel and cobalt and unavoidable impurities unless they affect the presently disclosed porous body's function and effect. However, the outer shell preferably includes a nickel-cobalt alloy as a major component. Herein, a "major component" in the outer shell means a component having the largest mass ratio in the framework. More specifically, when the outer shell contains a component in an amount exceeding 50% by mass, the component is referred to as a major component of the outer shell.

The total content of nickel and cobalt in the outer shell is preferably 80% by mass or more, more preferably 90% by mass or more, most preferably 95% by mass or more for example before the porous body is used as a current collector for an SOFC, that is, before the porous body is exposed to a high temperature of 700° C. or higher. The total content of nickel and cobalt may be 100% by mass. When the total content of nickel and cobalt in the outer shell is 100% by mass, the outer shell's composition can be represented by a chemical formula of $Ni_sCo_t$, where $0.6 \leq s \leq 1.2$, and $1.8 \leq t < 2.4$, or $Ni_mCo_n$, where $1.8 \leq m \leq 2.4$, and $0.6 \leq n \leq 1.2$.

When the outer shell has a higher total content of nickel and cobalt, and the porous body is used as a current collector for a SOFC or the like, a ratio of a generated oxide being a spinel-type oxide composed of at least one of nickel and cobalt, and oxygen, tend to increase. Thus, the porous body can maintain high conductivity even when used in a high temperature environment.

(Ratio in Mass of Cobalt to Total Mass of Nickel and Cobalt)

The outer shell includes cobalt at a ratio in mass of 0.2 or more and 0.4 or less or 0.6 or more and 0.8 or less to the total mass of nickel and cobalt of the outer shell. When a porous body having a framework with an outer shell having such a composition is used as a current collector for an SOFC or the like, then, as has been described above, a spinel-type oxide represented by a chemical formula of $Ni_xCo_{3-x}O_4$, where $0.6 \leq x \leq 1.2$ or $1.8 \leq x \leq 2.4$, typically $NiCo_2O_4$ or $Ni_2CoO_4$, is generated in the outer shell by oxidation. As the outer shell is oxidized, a spinel-type oxide represented by the chemical formula of $CoCo_2O_4$ may also be generated. The spinel-type oxide exhibits high conductivity, and the porous body can hence maintain high conductivity even when the outer shell is entirely oxidized as the porous body is used in a high temperature environment.

When the outer shell includes cobalt at any ratio in mass of less than 0.2, more than 0.4 and less than 0.6, and more than 0.8 to the total mass of nickel and cobalt of the outer shell, oxidization generates a spinel type oxide represented by a chemical formula such as $Ni_xCo_{3-x}O_4$ or $CoCo_2O_4$ in the framework at a reduced ratio. For this reason, when the porous body is used as a current collector for an SOFC, it tends to be difficult to maintain high conductivity by oxidation. From the viewpoint of increasing the ratio at which a spinel-type oxide is generated in the outer shell, the outer shell preferably includes cobalt at a ratio in mass of 0.28 or more and 0.38 or less, or 0.62 or more and 0.72 or less to the total mass of nickel and cobalt in the outer shell.

(Additive Elements)

Herein, the outer shell further includes at least one additive element selected from the group consisting of nitrogen, sulfur, fluorine, and chlorine, and the additive element is 5 ppm or more and 10,000 ppm or less. More preferably, it is 10 ppm or more and 8,000 ppm or less. Furthermore, the outer shell may include phosphorus as an additive element, and the additive element in that case is 5 ppm or more and 50,000 ppm or less. More preferably, it is 10 ppm or more and 40,000 ppm or less.

Furthermore, preferably, the outer shell further includes at least two or more additive elements selected from the group consisting of nitrogen, sulfur, fluorine, chlorine, and phosphorus, and the total of the additive elements is 5 ppm or more and 50,000 ppm or less. More preferably, it is 10 ppm or more and 10,000 ppm or less.

When the porous body is used as a material for a current collector for a SOFC, it is exposed to a high temperature of 700 to 1,000° C., as has been set forth above. However, as the outer shell includes the additive element described above, the porous body can maintain high strength (or creep characteristic).

(Oxygen)

Preferably, the outer shell further includes oxygen. Specifically, the outer shell includes oxygen in an amount of 0.1% by mass or more and 35% by mass or less. The oxygen in the outer shell can be detected, for example, after the porous body is used as a current collector for an SOFC. That is, preferably, after the porous body is exposed to a temperature of 700° C. or higher, the outer shell includes oxygen in an amount of 0.1% by mass or more and 35% by mass or less. More preferably, the outer shell includes oxygen in an amount of 10 to 30% by mass, still more preferably 25 to 28% by mass.

When the outer shell includes oxygen in an amount of 0.1% by mass or more and 35% by mass or less, a thermal history that the porous body has been exposed to a high temperature of 700° C. or higher and 1,100° C. or lower for 1 hour or more can be inferred. Furthermore, when the porous body is used as a current collector of an SOFC and the like and thus exposed to a high temperature of 700° C. or higher, and a spinel-type oxide composed of at least one of nickel and cobalt, and oxygen is generated in the outer shell, the outer shell tends to include oxygen in an amount of 0.1% by mass or more and 35% by mass or less.

That is, the outer shell preferably includes a spinel-type oxide. Thus, the porous body can maintain high conductivity more effectively even when it is oxidized. When the outer shell has an oxygen content departing the above range, the porous body tends to fail to obtain as desired an ability to maintain high conductivity more effectively when it is oxidized.

(Unavoidable Impurities)

The outer shell can contain unavoidable impurities, as has been described above, insofar as they do not affect a function and effect that the present, disclosed porous body has. The outer shell may include, for example, silicon, magnesium, carbon, tin, aluminum, sodium, iron, tungsten, titanium, boron, silver, gold, chromium, molybdenum and the like as components of unavoidable impurities. These components may be included, for example, as unavoidable impurities that are unavoidably introduced in a manufacturing method described hereinafter. For example, examples of unavoidable impurities include elements included in a conductive coating layer formed by a conductiveness imparting treatment described hereinafter. Further, the outer shell may include the above-described oxygen as a component of an unavoidable impurity in a state before the porous body is used as a current collector for an SOFC. The outer shell preferably includes unavoidable impurities individually in an amount of 5% by mass or less, and together in an amount of 10% by mass or less.

The outer shell's nickel and cobalt contents can be determined as follows: the porous body is dissolved in aqua regia to provide a solution and the solution's metal composition can be analyzed with a high-frequency inductively coupled mass spectrometer (ICP-MS, for example, trade name: "ICPMS-2030" manufactured by Shimadzu Corporation) to determine the outer shell's nickel and cobalt contents. Specifically, the outer shell's nickel and cobalt contents (in % by mass), a ratio in mass of cobalt in the outer shell to the total mass of nickel and cobalt in the outer shell, and the like can be determined.

The outer shell's oxygen content (in % by mass) can be determined as follows:

an image of a cross section of the framework cut perpendicularly to its longitudinal direction, as obtained through a scanning electron microscope (SEM), as described above, can be analyzed with an EDX device accompanying the SEM (for example, an SEM: trade name "SUPRA35VP" manufactured by Carl Zeiss Microscopy Co., Ltd., and an EDX device: trade name "octane super" manufactured by AMETEK, Inc.) to determine the outer shell's oxygen content. The EDX device can also be used to determine the outer shell's nickel and cobalt contents. Specifically, based on the atomic concentration of each element detected by the EDX device, the outer shell's oxygen, nickel and cobalt in % by mass, mass ratio, and the like can be determined. Further, whether the framework has a spinel-type oxide composed of at least one of nickel and cobalt, and oxygen can be determined by exposing the cross section to an X-ray and analyzing its diffraction pattern, i.e., by X-ray diffractometry (XRD).

For example, whether the outer shell has a spinel-type oxide can be determined using a measurement device such as an X-ray diffractometer (for example, trade name (model number): "Empyrean" manufactured by Spectris, and analysis software: "integrated X-ray powder diffraction software PDXL").

The measurement may be done for example under the following conditions:

(Measurement Conditions)

X-ray diffractometry: θ-2θ method

Measuring system: collimated beam optical system mirror scan range (2θ): 10 to 90°, cumulative time: 1 second/step, step: 0.03°.

<<Current Collector>>

A current collector according to the present embodiment includes the porous body described above. As has been described above, the porous body can maintain high conductivity in a high temperature environment. For this reason, the current collector can be suitably used as a material for a current collector for an SOFC which reaches a high temperature of 700° C. or higher in operation.

<<Fuel Cell>>

Figure 13:
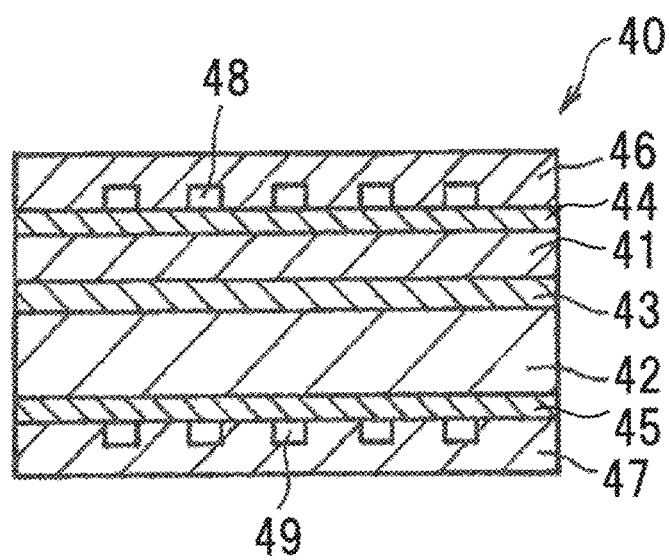
FIG. 13 is a schematic cross section of a fuel cell according to an embodiment of the present disclosure.

As shown in FIG. 13, a fuel cell 40 according to the present embodiment includes a cathode 41, a cathode-side current collector 44, an anode 42, an anode-side current collector 45, and a solid electrolyte layer 43 posed between cathode 41 and anode 42. On cathode-side current collector 44 and anode-side current collector 45, a cathode-side separator 46 and an anode-side separator 47, respectively, are disposed so as to face solid electrolyte layer 43. An oxidant channel 48 for supplying an oxidant to cathode 41 is formed by cathode-side separator 46, and a fuel channel 49 for supplying fuel to anode 42 is formed by anode-side separator 47.

The fuel cell according to the present embodiment includes at least one current collector of cathode-side current collector 44 or anode-side current collector 45. The current collector includes a porous body that can maintain high conductivity in a high-temperature environment, as has been described above. Thus the current collector can be suitably used as at least one of a cathode-side current collector or an anode-side current collector of an SOFC which reaches a high temperature of 700° C. or higher in operation. For the fuel cell, it is more suitable to use the current collector as the cathode-side current collector as the porous body includes nickel and cobalt.

<<Method for Producing Porous Body>>

The porous body according to the present embodiment can be produced by appropriately using a conventionally known method. For this reason, while the method for producing the porous body should not be specifically limited, preferably, it is the following method:

That is, preferably, the porous body is produced in a method of producing a porous body comprising: forming a conductive coating layer on a resin molded body having a three-dimensional network structure to obtain a conductive resin molded body (a first step); plating the conductive resin molded body with a nickel-cobalt alloy to obtain a porous body precursor (a second step); and applying a heat treatment to the porous body precursor to incinerate a resin component in the conductive resin molded body and thus remove the resin component to obtain the porous body (a third step).

<First Step>

Initially, a sheet of a resin molded body having a three-dimensional network structure (hereinafter also simply referred to as a "resin molded body") is prepared. Polyurethane resin, melamine resin, or the like can be used as the resin molded body. Furthermore, as a conductiveness imparting treatment for imparting conductiveness to the resin molded body, a conductive coating layer is formed on a surface of the resin molded body. The conductiveness imparting treatment can for example include:

applying a conductive paint containing conductive ceramic or similarly conductive particles and a binder to the resin molded body, impregnating the resin molded body with the conductive paint, or the like to include the conductive paint in a surface of the resin molded body; forming a layer of a conductive metal such as nickel and copper on a surface of the resin molded body by electroless plating; forming a layer of a conductive metal on a surface of the resin molded body by vapor deposition or sputtering; and the like. A conductive resin molded body can thus be obtained.

<Second Step>

Subsequently, the conductive resin molded body is plated with a nickel-cobalt alloy to obtain a porous body precursor. While the conductive resin molded body can be plated with a nickel-cobalt alloy by electroless plating, electrolytic plating (so-called nickel-cobalt alloy electroplating) is preferably used from the viewpoint of efficiency. In nickel-cobalt alloy electroplating, the conductive resin molded body is used as a cathode.

Nickel-cobalt alloy electroplating can be done using a known plating bath. For example, a watt bath, a chloride bath, a sulfamic acid bath, or the like can be used. The electrolytic plating with the nickel-cobalt alloy can be done with a plating bath having a composition, and under conditions, for example as follows:

(Bath Composition)

Salt (aqueous solution): Nickel sulfamate and cobalt sulfamate: 350 to 450 g/L as the total amount of Ni and Co (Note: The ratio in mass of Ni/Co is adjusted from Co/(Ni+Co)=0.2 to 0.4 or Co/(Ni+Co)=0.6 to 0.8 by the ratio in mass of Co to the total mass of Ni and Co as desired.)

Boric acid: 30-40 g/L pH: 4-4.5.

(Conditions for Electrolysis)

Temperature: 40-60° C.

Current density: 0.5 to 10 A/dm$^2$

Anode: Insoluble anode.

A porous body precursor having a conductive resin molded body plated with a nickel-cobalt alloy can thus be obtained. In addition, when it is desired to add an additive element such as nitrogen, sulfur, fluorine, chlorine, and phosphorus, various additives can be introduced into the plating bath to cause the porous body precursor to contain them. Examples of various additives include, but are not limited to, sodium nitrate, sodium sulfate, sodium fluoride, sodium chloride, and sodium phosphate, and it is sufficient that any one of the additives is included.

<Third Step>

Subsequently, the porous body precursor is subjected to a heat treatment to incinerate a resin component in the conductive resin molded body and remove the resin component to obtain the porous body. Thus a porous body having a framework having a three-dimensional network structure can be obtained. The heat treatment for removing the resin component may be done for example at a temperature of 600° C. or higher in an atmosphere which is an oxidizing atmosphere such as air.

Herein, the porous body obtained in the above method has an average pore diameter substantially equal to that of the resin molded body. Accordingly, the average pore diameter of the resin molded body used to obtain the porous body may be selected, as appropriate, depending on the application of the porous body. As the porous body has a porosity ultimately determined by the amount (the apparent weight) of the plating metal, the apparent weight of the plating nickel-cobalt alloy may be selected as appropriate depending on the porosity required for the porous body as a final product. The resin molded body's porosity and average pore diameter are defined in the same manner as the above described porous body's porosity and average pore diameter, and can be determined based on the above calculation formula with the term "frame" replaced with the term "resin molded body."

Through the above steps, the porous body according to the present embodiment can be produced. The porous body includes a framework having a three-dimensional network structure, and the framework has an outer shell including nickel and cobalt. Furthermore, the outer shell includes cobalt at a ratio in mass of 0.2 or more and 0.4 or less or 0.6 or more and 0.8 or less to the total mass of nickel and cobalt of the outer shell. Hence, the porous body can maintain high conductivity in a high temperature environment.

EXAMPLE 1

Hereinafter, the present invention will more specifically be described with reference to examples although the present invention is not limited thereto.

<<Preparing Porous Body>>

<Sample 1-1>

A porous body for Sample 1-1 was produced through the following procedure:

(First Step)

Initially, a 1.5 mm thick polyurethane resin sheet was prepared as a resin molded body having a three-dimensional network structure. When this polyurethane resin sheet's porosity and average pore diameter were determined based on the above formula, the porosity was 96% and the average pore diameter was 450 µm.

Subsequently, 100 g of carbon black, which was amorphous carbon having a particle size of 0.01 to 0.2 µm, was dispersed in 0.5 L of an aqueous solution of 10% by mass of acrylic ester resin to prepare a conductive paint. The resin molded body was impregnated with the conductive paint, and then squeezed with a roll and dried to form a conductive coating layer on a surface of the resin molded body. A conductive resin molded body was thus obtained.

(Second Step)

Using the conductive resin molded body as a cathode, electrolytic plating with a nickel-cobalt alloy was performed with a bath composition under conditions for electrolysis, as indicated below. As a result, 660 g/m$^2$ of a nickel-cobalt alloy was deposited on the conductive resin molded body, and a porous body precursor is thus obtained.

<Bath Composition>

Salt (aqueous solution): Nickel sulfamate and cobalt sulfamate: The total amount of Ni and Co is 400 g/L (Note: the ratio in mass of Co/(Ni+Co) is 0.1.)

Boric acid: 35 g/L pH: 4.5.

<Conditions for electrolysis>

Temperature: 50° C.

Current density: 5 A/dm$^2$

Anode: Insoluble anode.

(Third Step)

The porous body precursor was subjected to a heat treatment to incinerate a resin component in the conductive resin molded body and remove the resin component to obtain a porous body for Sample 1. The heat treatment for removing the resin component was done for example at a temperature of 650° C. in an atmosphere of air.

<Sample 1-2>

A porous body for Sample 1-2 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.2.

<Sample 1-3>

A porous body for Sample 1-3 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.33.

<Sample 1-4>

A porous body for Sample 1-4 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.4.

<Sample 1-5>

A porous body for Sample 1-5 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.5.

<Sample 1-6>

A porous body for Sample 1-6 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.6.

<Sample 1-7>

A porous body for Sample 1-7 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.67.

<Sample 1-8>

A porous body for Sample 1-8 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.8.

<Sample 1-9>

A porous body for Sample 1-9 was prepared in the same manner as that for Sample 1-1 except that, for the bath composition used in the second step, the total amount of Ni and Co contained in nickel sulfamate and cobalt sulfamate was 400 g/L, and the ratio in mass of Co/(Ni+Co) was 0.9.

<<Evaluating Performance of Porous Body>><Analyzing Physical Property of Porous Body>

The porous bodies of Samples 1-1 to 1-9 obtained in the above-described method each had the ratio in mass of cobalt therein to the total mass of nickel and cobalt therein determined using the ICP-MS device described above (trade name: "ICPMS-2030" manufactured by Shimadzu Corporation).

Specifically, the porous body of each sample was dissolved in aqua regia to obtain a solution, and the solution's metal composition was examined using the ICP-MS device. As a result, the ratio in mass of cobalt in the outer shell of the framework of the porous body of each of Samples 1-1 to 1-9 to the total mass of nickel and cobalt in the outer shell matched the ratio in mass of cobalt contained in the plating bath used to prepare the porous body to the total mass of nickel and cobalt (Co/(Ni+Co)) contained in the plating bath.

Further, the above calculation formula was used to determine the average pore diameter and porosity of each of the porous bodies of Samples 1-1 to 1-9. As a result, the average pore diameter and porosity matched the resin molded body's porosity and average pore diameter, and the porosity was 96% and the average pore diameter was 450 μm. Further, the porous bodies of Samples 1-1 to 1-9 had a thickness of 1.4 mm. In each of the porous bodies of Samples 1 to 9, the total apparent weight of nickel and cobalt was 660 g/m$^2$, as has been set forth above.

<Evaluating Electrical Resistivity>

Further, in order to evaluate conductivity in a high temperature environment, a method was used to measure the porous bodies of Samples 1-1 to 1-9 in electrical resistivity, as follows:

Specifically, the porous bodies of Samples 1-1 to 1-9 were subjected to a heat treatment continuously at 800° C. in an atmosphere of air and a 4-terminal method was used to measure electrical resistivity (unit: mΩ·cm$^2$) before the heat treatment was applied (that is, at 0 hour) and thereafter when predetermined periods of time (144 hours, 500 hours, and 1,000 hours) elapsed and thus some predetermined time points were reached. Electrical resistivity was measured in the direction of the thickness of film of the porous body. Evaluation was done as follows: when a porous body having been subjected to the heat treatment continuously for 1,000 hours presented an electrical resistivity below 400 mΩ·cm$^2$, the porous body was evaluated as a good product (evaluation: A). Furthermore, when a porous body having been subjected to the heat treatment continuously for a predetermined period of time presented an electrical resistivity exceeding 800 mΩ·cm$^2$, the porous body was evaluated as a defective product (evaluation: B), and the measurement was terminated. The results are shown in Table 1.

TABLE 1

| | Co/(Ni + Co) | electrical resistivity (mΩ · cm$^2$) heat treatment time | | | | evaluation |
|---|---|---|---|---|---|---|
| | | 0 hr | 144 hr | 500 hr | 1,000 hr | |
| sample 1-1 | 0.10 | 80 | 416 | 878 | — | B |
| sample 1-2 | 0.20 | 72 | 80 | 120 | 125 | A |
| sample 1-3 | 0.33 | 70 | 72 | 100 | 108 | A |
| sample 1-4 | 0.40 | 65 | 234 | 256 | 262 | A |
| sample 1-5 | 0.50 | 60 | 794 | 2162 | — | B |
| sample 1-6 | 0.60 | 69 | 324 | 336 | 343 | A |
| sample 1-7 | 0.67 | 81 | 245 | 248 | 250 | A |
| sample 1-8 | 0.80 | 92 | 315 | 346 | 362 | A |
| sample 1-9 | 0.90 | 101 | 562 | 1900 | — | B |

<Discussion>

According to Table 1, it has been revealed that the porous bodies of Samples 1-2, 1-3, 1-4, 1-6, 1-7, and 1-8, in which the ratio in mass of cobalt in the outer shell to the total mass of nickel and cobalt in the outer shell is 0.2 or more and 0.4 or less, or 0.6 or more and 0.8 or less, maintain higher conductivity in a high temperature environment than the porous bodies of Samples 1-1, 1-5, and 1-9, which do not satisfy the above mass ratio.

<<Composition of Porous Body after Heat Treatment>>

Figure 10:
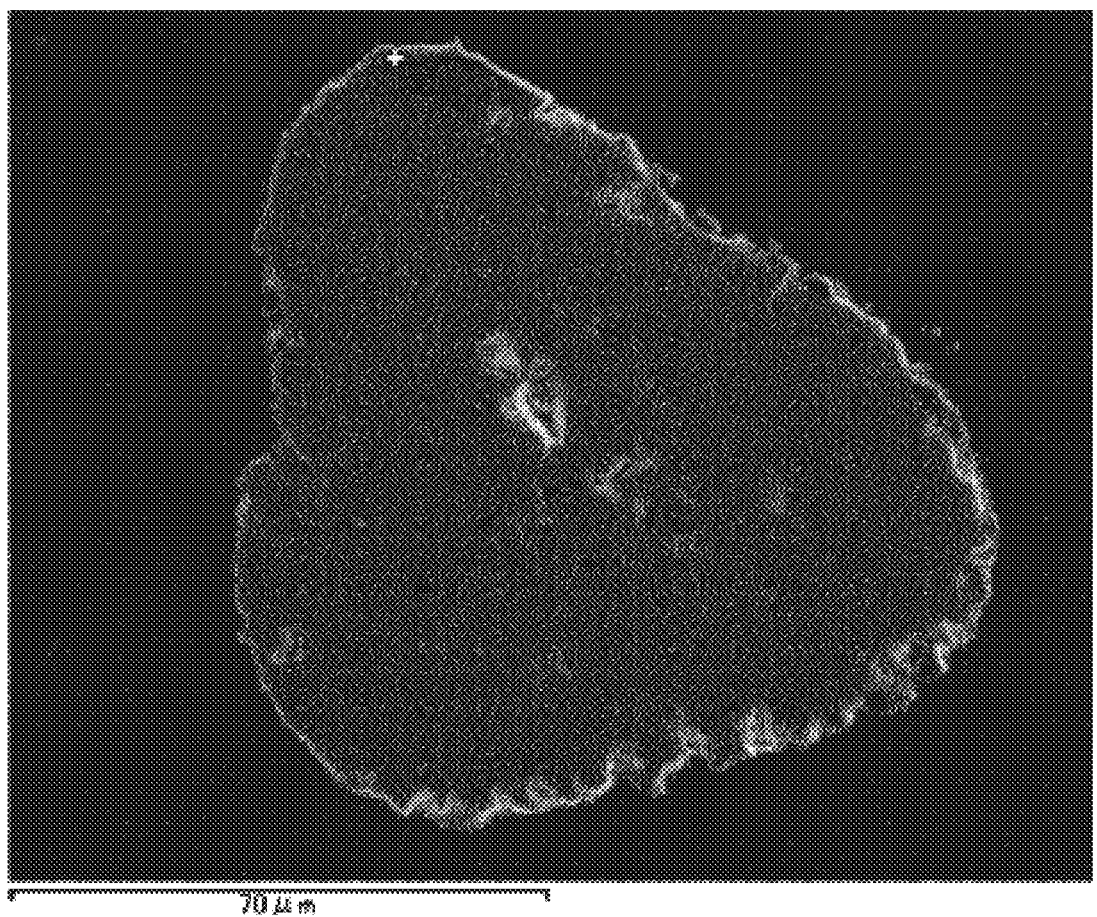
FIG. 10 is a photographical image used instead of a drawing for illustrating that the porous body of sample 1-3 has its framework observed in cross section with an electron microscope and the framework has its outer shell's outer portion, as seen in the direction of the thickness of the outer shell, measured for an analysis using energy dispersive X-ray analysis (EDX) in order to illustrate a composition after a heat treatment simulating using the porous body in a SOFC.
Figure 11:
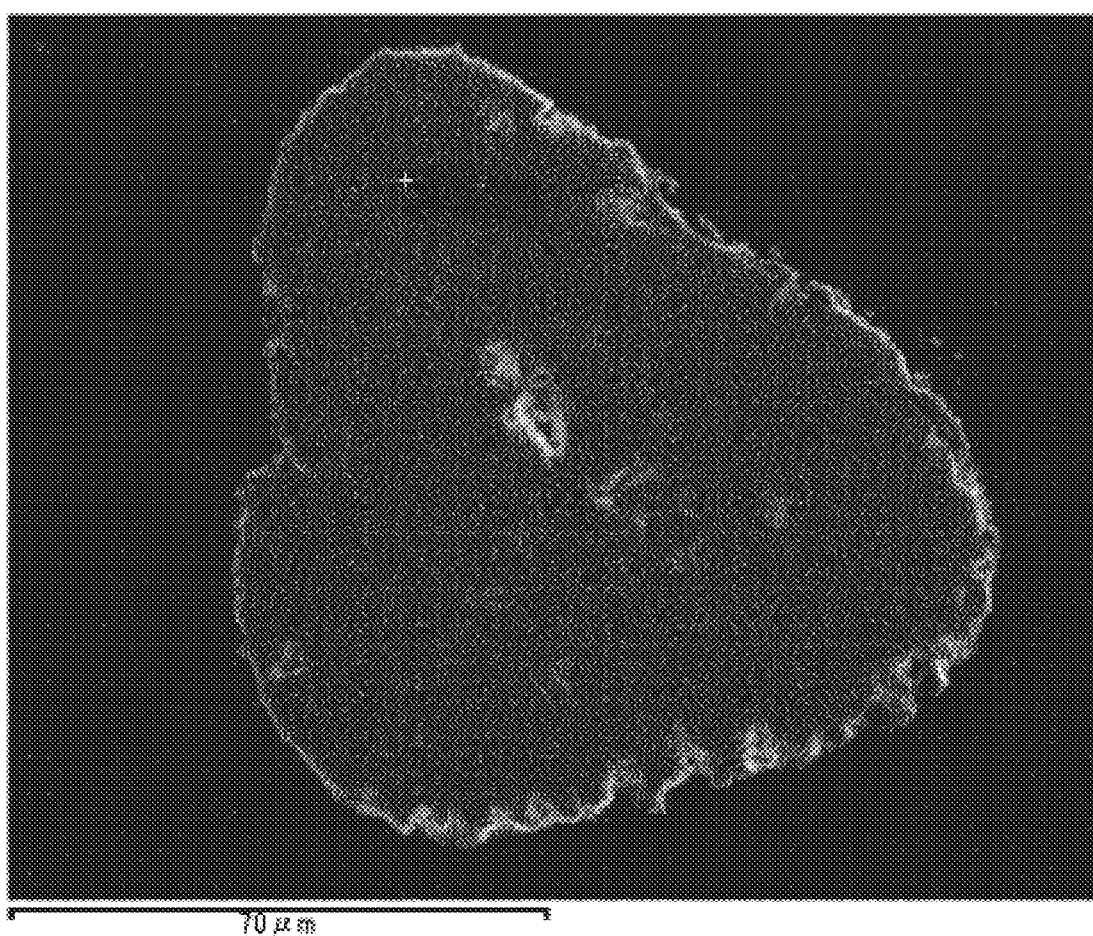
FIG. 11 is a photographical image used instead of a drawing for illustrating that the porous body of sample 1-3 has its framework observed in cross section with an electron microscope and the framework has its outer shell's intermediate portion, as seen in the direction of the thickness of the outer shell, measured for an analysis using energy dispersive X-ray analysis (EDX) in order to illustrate a composition after a heat treatment simulating using the porous body in a SOFC.
Figure 12:
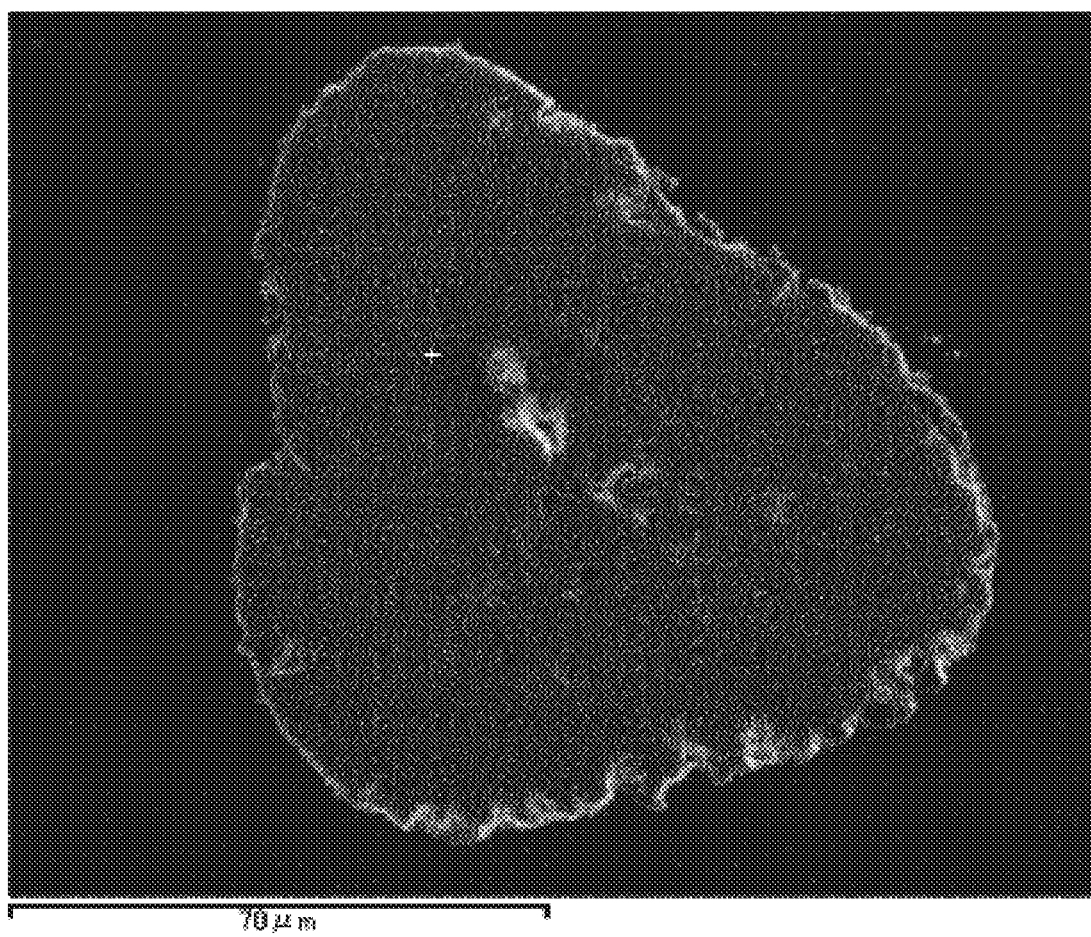
FIG. 12 is a photographical image used instead of a drawing for illustrating that the porous body of sample 1-3 has its framework observed in cross section with an electron microscope and the framework has its outer shell's inner portion, as seen in the direction of the thickness of the outer shell, measured for an analysis using energy dispersive X-ray analysis (EDX) in order to illustrate a composition after a heat treatment simulating using the porous body in a SOFC.

The porous body of Sample 1-3 was subjected to a heat treatment at 800° C. for 500 hours in an atmosphere of air, and then photographed in a cross section with an electron microscope (trade name: "SUPRA35VP" manufactured by Carl Zeiss Microscopy Co., Ltd.). The obtained microscopic images (electron-microscopic images) are shown in FIGS. 10 to 12. An EDX device (trade name: "octane super" manufactured by AMETEK, Inc.) accompanying the electron microscope was used to conduct a composition analysis such that an outer portion (a position indicated in FIG. 10 by +), an intermediate portion (a position indicated in FIG. 11 by +), and an inner portion (a position indicated in FIG. 12 by +) of the outer shell of the framework of the porous body in the direction of the thickness of the outer shell, as appearing in the cross section, were portions subjected to measurement. The results are shown in Table 2. Why carbon (C) is detected in Table 2 is believed to be attributed to a residue of the incinerated resin component. Although why aluminum (Al) is detected is unknown, it is believed that residual abrasive grains were introduced while the cross section of the porous body was made.

TABLE 2

| | composition of porous metal body (sample 1-3) after heat treatment (concentration of element detected through EDX [atomic %]) | | | | |
|---|---|---|---|---|---|
| | C | O | Al | Co | Ni |
| outer portion | 6.77 | 54.43 | 1.02 | 14.66 | 23.12 |
| intermediate portion | 6.42 | 47.62 | 1.38 | 16.51 | 28.07 |
| inner portion | 6.05 | 49.07 | undetected | 15.36 | 29.52 |

According to Table 2, it can be seen that the porous body had a framework with an outer shell entirely having a relationship of an atomic ratio of approximately Ni:Co:O=2:1:4, which has suggested that a spinel-type oxide of $Ni_2CoO_4$ had been formed. That is, it can be understood that the porous body of Sample 1-3, even when used in a high temperature environment and accordingly having the framework entirely oxidized, maintains high conductivity as the spinel-type oxide of $Ni_2CoO_4$ is formed. Further, a cross section of the porous body of Sample 1-3 subjected to the above heat treatment was analyzed using the X-ray diffractometer described above, and as a result, it was inferred that the outer shell of the framework of the porous body of Sample 1-3 had a spinel-type oxide of $Ni_2CoO_4$.

In view of a variety of analyses of Sample 1-3, the porous bodies of Samples 1-2, 1-4, and 1-6 to 1-8 are believed to have a spinel-type oxide generated therein similarly as the porous body of Sample 1-3 is, and therefore maintain high conductivity even when used in a high temperature environment and thereby having the framework's outer shell entirely oxidized.

EXAMPLE 2

Hereinafter, examples in which nitrogen, sulfur, phosphorus, fluorine, and chlorine are added as additive elements will be described.

<<Preparing Porous Body>>

<Sample 2-1> to <Sample 2-4>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Further, sodium nitrate was added to the plating bath to add nitrogen as an additive element in amounts of 3 ppm, 5 ppm, 9,000 ppm, and 11,000 ppm to thus prepare porous bodies for Samples 2-1 to 2-4.

<Sample 2-5> to <Sample 2-8>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Further, sodium nitrate was added to the plating bath to add nitrogen as an additive element in amounts of 3 ppm, 5 ppm, 9,000 ppm, and 11,000 ppm to thus prepare porous bodies for Samples 2-5 to 2-8.

<Sample 3-1> to <Sample 3-4>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Further, sodium sulfate was added to the plating bath to add sulfur as an additive element in amounts of 3 ppm, 5 ppm, 9,000 ppm, and 11,000 ppm to thus prepare porous bodies for Samples 3-1 to 3-4.

<Sample 3-5> to <Sample 3-8>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Further, sodium sulfate was added to the plating bath to add sulfur as an additive element in amounts of 3 ppm, 5 ppm, 9,000 ppm, and 11,000 ppm to thus prepare porous bodies for Samples 3-5 to 3-8.

<Sample 4-1> to <Sample 4-4>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Further, sodium phosphate was added to the plating bath to add phosphorus as an additive element in amounts of 3 ppm, 5 ppm, 50,000 ppm, and 55,000 ppm to thus prepare porous bodies for Samples 4-1 to 4-4.

<Sample 4-5> to <Sample 4-8>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Further, sodium phosphate was added to the plating bath to add phosphorus as an additive element in amounts of 3 ppm, 5 ppm, 50,000 ppm, and 55,000 ppm to thus prepare porous bodies for Samples 4-5 to 4-8.

<Sample 5-1> to <Sample 5-4>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Further, sodium fluoride was added to the plating bath to add fluorine as an additive element in amounts of 3 ppm, 5 ppm, 9,000 ppm, and 11,000 ppm to thus prepare porous bodies for Samples 5-1 to 5-4.

<Sample 5-5> to <Sample 5-8>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Further, sodium fluoride was added to the plating bath to add fluorine as an additive element in amounts of 3 ppm, 5 ppm, 9,000 ppm, and 11,000 ppm to thus prepare porous bodies for Samples 5-5 to 5-8.

<Sample 6-1> to <Sample 6-4>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Further, sodium chloride was added to the plating bath to add chlorine as an additive element in amounts of 3 ppm, 5 ppm, 9,000 ppm, and 11,000 ppm to thus prepare porous bodies for Samples 6-1 to 6-4.

<Sample 6-5> to <Sample 6-8>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Further, sodium chloride was added to the plating bath to add chlorine as an additive element in amounts of 3 ppm, 5 ppm, 9,000 ppm, and 11,000 ppm to thus prepare porous bodies for Samples 6-5 to 6-8.

<Sample 7-1>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Moreover, sodium chloride was added to the plating bath to add 2 ppm of chlorine as an additive element and sodium phosphate was added to the plating bath to add 1 ppm of phosphorus as an additive element to prepare for Sample 7-1 a porous body with the additive elements having a total concentration of 3 ppm.

<Sample 7-2>

The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Moreover, sodium chloride was added to the plating bath to add 2 ppm of chlorine as an additive element and sodium phosphate was added to the plating bath to add 3 ppm of phosphorus as an additive element to prepare for Sample 7-2 a porous body with the additive elements having a total concentration of 5 ppm.

<Sample 7-3>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Moreover, sodium nitrate was added to the plating bath to add 2 ppm of nitrogen as an additive element and sodium sulfate was added to the plating bath to add 3 ppm of sulfur as an additive element to prepare for Sample 7-3 a porous body with the additive elements having a total concentration of 5 ppm.

<Sample 7-4>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Moreover, sodium fluoride was added to the plating bath to add 10,000 ppm of fluorine as an additive element, sodium phosphate was added to the plating bath to add 30,000 ppm of phosphorus as an additive element, and sodium sulfate was added to the plating bath to add 10,000 ppm of sulfur as an additive element to prepare for Sample 7-4 a porous body with the additive elements having a total concentration of 50,000 ppm.

<Sample 7-5>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.33. Moreover, sodium fluoride was added to the plating bath to add 5,000 ppm of fluorine as an additive element, sodium phosphate was added to the plating bath to add 30,000 ppm of phosphorus as an additive element, and sodium sulfate was added to the plating bath to add 20,000 ppm of sulfur as an additive element to prepare for Sample 7-5 a porous body with the additive elements having a total concentration of 55,000 ppm.

<Sample 7-6>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Moreover, sodium chloride was added to the plating bath to add 2 ppm of chlorine as an additive element and sodium phosphate was added to the plating bath to add 1 ppm of phosphorus as an additive element to prepare for Sample 7-6 a porous body with the additive elements having a total concentration of 3 ppm.

<Sample 7-7>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Moreover, sodium chloride was added to the plating bath to add 2 ppm of chlorine as an additive element and sodium phosphate was added to the plating bath to add 3 ppm of phosphorus as an additive element to prepare for Sample 7-7 a porous body with the additive elements having a total concentration of 5 ppm.

<Sample 7-8>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Moreover, sodium nitrate was added to the plating bath to add 2 ppm of nitrogen as an additive element and sodium sulfate was added to the plating bath to add 3 ppm of sulfur as an additive element to prepare for Sample 7-8 a porous body with the additive elements having a total concentration of 5 ppm.

<Sample 7-9>
The same manner as Sample 1-1 was used except that, for the bath composition used in the second step in Example 1, the total amount of Ni and Co contained in nickel sulfamate and cobalt sulfamate was 400 g/L, and the ratio in mass of Co/(Ni+Co) was 0.66. Moreover, sodium fluoride was added to the plating bath to add 10,000 ppm of fluorine as an additive element, sodium phosphate was added to the plating bath to add 45,000 ppm of phosphorus as an additive element, and sodium sulfate was added to the plating bath to add 5,000 ppm of sulfur as an additive element to prepare for Sample 7-9 a porous body with the additive elements having a total concentration of 60,000 ppm.

<<Evaluating Performance of Porous Body>>
<Creep Characteristic of Porous Body>
The porous bodies of Samples 2-1 to 7-9 underwent a heat treatment in an atmosphere of air at 800° C. for 1,000 hours with a block of SUS 430 placed on each sample to apply a load of 0.2 MPa thereto. Evaluation was done as follows: each sample's rate of change in thickness after the heat treatment was measured using a digital thickness gauge manufactured by Teclock. A porous body with a rate of change in thickness of less than 5% was evaluated as a good product (evaluation: A), a porous body with a rate of change in thickness of 5% or more was evaluated as a defective product (evaluation: B), and a cracked porous body was regarded as unmeasurable (evaluation: C). The results are shown in Tables 3 to 8.

TABLE 3

| | Co/(Ni + Co) | concentration of nitrogen (ppm) | rate of change in thickness (%) | evaluation |
|---|---|---|---|---|
| sample 2-1 | 0.33 | 3 | 8.5 | B |
| sample 2-2 | 0.33 | 5 | 4.5 | A |
| sample 2-3 | 0.33 | 9000 | 2.3 | A |
| sample 2-4 | 0.33 | 11000 | cracked | C |
| sample 2-5 | 0.66 | 3 | 8.2 | B |
| sample 2-6 | 0.66 | 5 | 4.6 | A |
| sample 2-7 | 0.66 | 9000 | 2.2 | A |
| sample 2-8 | 0.66 | 11000 | cracked | C |

TABLE 4

| | Co/(Ni + Co) | concentration of sulfur (ppm) | rate of change in thickness (%) | evaluation |
|---|---|---|---|---|
| sample 3-1 | 0.33 | 3 | 8.6 | B |
| sample 3-2 | 0.33 | 5 | 4.5 | A |
| sample 3-3 | 0.33 | 9000 | 2.2 | A |
| sample 3-4 | 0.33 | 11000 | cracked | C |
| sample 3-5 | 0.66 | 3 | 8.3 | B |
| sample 3-6 | 0.66 | 5 | 4.3 | A |
| sample 3-7 | 0.66 | 9000 | 2.1 | A |
| sample 3-8 | 0.66 | 11000 | cracked | C |

TABLE 5

|  | Co/(Ni + Co) | concentration of phosphorus (ppm) | rate of change in thickness (%) | evaluation |
|---|---|---|---|---|
| sample 4-1 | 0.33 | 3 | 8.1 | B |
| sample 4-2 | 0.33 | 5 | 4.2 | A |
| sample 4-3 | 0.33 | 50000 | 1.8 | A |
| sample 4-4 | 0.33 | 55000 | cracked | C |
| sample 4-5 | 0.66 | 3 | 8.2 | B |
| sample 4-6 | 0.66 | 5 | 4.2 | A |
| sample 4-7 | 0.66 | 50000 | 1.9 | A |
| sample 4-8 | 0.66 | 55000 | cracked | C |

TABLE 6

|  | Co/(Ni + Co) | concentration of fluorine (ppm) | rate of change in thickness (%) | evaluation |
|---|---|---|---|---|
| sample 5-1 | 0.33 | 3 | 8.9 | B |
| sample 5-2 | 0.33 | 5 | 4.7 | A |
| sample 5-3 | 0.33 | 9000 | 2.6 | A |
| sample 5-4 | 0.33 | 11000 | cracked | C |
| sample 5-5 | 0.66 | 3 | 8.8 | B |
| sample 5-6 | 0.66 | 5 | 4.7 | A |
| sample 5-7 | 0.66 | 9000 | 2.8 | A |
| sample 5-8 | 0.66 | 11000 | cracked | C |

TABLE 7

|  | Co/(Ni + Co) | concentration of chlorine (ppm) | rate of change in thickness (%) | evaluation |
|---|---|---|---|---|
| sample 6-1 | 0.33 | 3 | 9.0 | B |
| sample 6-2 | 0.33 | 5 | 4.8 | A |
| sample 6-3 | 0.33 | 9000 | 2.4 | A |
| sample 6-4 | 0.33 | 11000 | cracked | C |
| sample 6-5 | 0.66 | 3 | 8.9 | B |
| sample 6-6 | 0.66 | 5 | 4.7 | A |
| sample 6-7 | 0.66 | 9000 | 2.3 | A |
| sample 6-8 | 0.66 | 11000 | cracked | C |

TABLE 8

|  | Co/(Ni + Co) | total concentration (ppm) | rate of change in thickness (%) | evaluation |
|---|---|---|---|---|
| sample 7-1 | 0.33 | 3 (chlorine: 2, phosphorus: 1) | 7.6 | B |
| sample 7-2 | 0.33 | 5 (chlorine: 2, phosphorus: 3) | 4.1 | A |
| sample 7-3 | 0.33 | 5 (nitrogen: 2, sulfur: 3) | 4.0 | A |
| sample 7-4 | 0.33 | 50000 (fluorine: 10000, phosphorus: 30000, sulfur: 10000) | 3.7 | A |
| sample 7-5 | 0.66 | 55000 (fluorine: 5000, phosphorus: 30000, sulfur: 20000) | cracked | C |
| sample 7-6 | 0.66 | 3 (chlorine: 2, phosphorus: 1) | 7.7 | B |
| sample 7-7 | 0.66 | 5 (chlorine: 2, phosphorus: 3) | 4.2 | A |
| sample 7-8 | 0.66 | 5 (nitrogen: 2, sulfur: 3) | 3.7 | A |
| sample 7-9 | 0.66 | 60000 (fluorine: 10000, phosphorus: 45000, sulfur: 5000) | cracked | C |

<Discussion>

According to Tables 3, 4, 6 and 7, it has been found that when there is one additive element, and its concentration is in a range of at least 5 ppm or more and 10,000 ppm or less, the above creep characteristic is satisfactory, and high strength is maintained in a high temperature environment. Further, according to Table 5, it has been found that when phosphorus as an additive element has a concentration in a range of at least 5 ppm or more and 50,000 ppm or less, the creep characteristic is satisfactory and high strength is maintained in a high temperature environment. Further, according to Table 8, it has been found that when a plurality of additive elements are contained, and the additive elements have a total concentration in a range of at least 5 ppm or more and 50,000 ppm or less, the creep characteristic is satisfactory and high strength is maintained in a high temperature environment.

Hereinafter, more preferable ranges will more specifically be indicated. When the additive element is nitrogen, a good creep characteristic is exhibited for a range of 5 ppm or more and 9,000 ppm or less. When the additive element is sulfur, a good creep characteristic is exhibited for a range of 5 ppm or more and 9,000 ppm or less. When the additive element is phosphorus, a good creep characteristic is exhibited for a range of 5 ppm or more and 50,000 ppm or less. When the additive element is fluorine, a good creep characteristic is exhibited for a range of 5 ppm or more and 9,000 ppm or less. When the additive element is chlorine, a good creep characteristic is exhibited for a range of 5 ppm or more and 9,000 ppm or less.

Although embodiments and examples of the present disclosure have been described above, it has also been planned from the beginning to appropriately combine the configurations of the above-described embodiments and examples.

It should be understood that the embodiments and examples disclosed herein have been described for the purpose of illustration only and in a non-restrictive manner in any respect. The scope of the present invention is indicated not by the above-described embodiments and examples but by the scope of claims, and is intended to include a meaning equivalent to the scope of claims and any modification within the scope.

REFERENCE SIGNS LIST

1: rib
2: node
10: frame
11: outer shell
12: framework
13: core
14: pore
20: cell
30: three-dimensional network structure
40: fuel cell 41: cathode
42: anode
43: solid electrolyte layer
44: cathode-side current collector
45: anode-side current collector
46: cathode-side separator
47: anode-side separator
48: oxidant channel
49: fuel channel
A: virtual plane
t: thickness

The invention claimed is:

1. A current collector comprising a porous body with a framework having an integrally continuous, three-dimensional network structure, the framework comprising an outer shed and a core, wherein the core includes including one or both of a hollow or a conductive material, wherein the outer shell includes including nickel and cobalt, the cobalt having a ratio in mass of 0.2 or more and 0.4 or less or 0.6 or more and 0.8 or less relative to the total mass of the nickel and the cobalt, and the outer shell includes a spinel-type oxide represented by a chemical formula of $Ni_xCo_3xO_4$, where $0.6 \leq x \leq 1.2$ or $1.8 \leq x \leq 2.4$.

2. A current collector comprising the porous body according to claim 1, wherein the outer shell further includes at least one additive element selected from the group consisting of nitrogen, sulfur, fluorine, and chlorine, and the additive element is 5 ppm or more and 10,000 ppm or less.

3. A current collector comprising the porous body according to claim 1, wherein the outer shell further includes phosphorus as an additive element, and the additive element is 5 ppm or more and 50,000 ppm or less.

4. A current collector comprising the porous body according to claim 1, wherein the outer shell further includes at least two or more additive elements selected from the group consisting of nitrogen, sulfur, fluorine, chlorine, and phosphorus, and the total of the additive elements is 5 ppm or more and 50,000 ppm or less.

5. A current collector comprising the porous body according to claim 1, wherein the outer shell further includes oxygen.

6. A current collector comprising the porous body according to claim 5, wherein the oxygen is 0.1% by mass or more and 35% by mass or less.

7. A current collector comprising the porous body according to claim 1, wherein when the outer shell is observed in cross section at a magnification of 3,000 times to obtain an image, the image presents in any area 10 m square thereof five or less voids each having a longer diameter of 1 m or more.

8. A current collector comprising the porous body according to claim 1, wherein the core is hollow.

9. A current collector comprising the porous body according to claim 1, wherein the porous body has a sheet-shaped external appearance and has a thickness of 0.2 mm or more and 2 mm or less.

10. A fuel cell comprising the current collector according to claim 1.

* * * * *